US008631337B2

(12) United States Patent
Arokiaswamy (10) Patent No.: US 8,631,337 B2
(45) Date of Patent: Jan. 14, 2014

(54) SYSTEMS AND METHODS OF COPYING DATA (75) Inventor: Prabhu Arokiaswamy, Maple Grove, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 251 days.

(21) Appl. No.: 13/070,218

(22) Filed: Mar. 23, 2011

(65) Prior Publication Data
US 2012/0246573 A1    Sep. 27, 2012

(51) Int. Cl.
G06F 15/00      (2006.01)
G06F 13/00      (2006.01)

(52) U.S. Cl.
USPC .......................................... 715/762; 715/765

(58) Field of Classification Search
USPC ................ 715/751–753, 763–765, 851–853
See application file for complete search history.

(56) References Cited

U.S. PATENT DOCUMENTS

| 5,603,034 | A  | * | 2/1997  | Swanson ........................ 717/111 |
| 6,029,002 | A  | * | 2/2000  | Afifi et al. ..................... 717/131 |
| 6,240,430 | B1 |   | 5/2001  | Deike et al. |
| 6,944,821 | B1 |   | 9/2005  | Bates et al. |
| 7,281,018 | B1 |   | 10/2007 | Begun et al. |
| 7,313,540 | B1 | * | 12/2007 | Hueler et al. ............... 705/36 R |
| 7,689,925 | B2 |   | 3/2010  | Hahn et al. |
| 7,865,905 | B2 |   | 1/2011  | Nauerz et al. |
| 7,873,532 | B2 |   | 1/2011  | Jones et al. |
| 7,877,678 | B2 |   | 1/2011  | Chopin et al. |
| 7,877,701 | B2 |   | 1/2011  | Cohen et al. |

OTHER PUBLICATIONS

File Transit, Many Paste 1.0.0.0, <http://www.filetransit.com/view.php?id=38278>, dated Sep. 2, 2008, File Transit, 5 pages.
"Copy Multiple Fields to Clipboard Script," thread295-696177, <http://www.tek-tips.com/viewthread.cfm?qid=696177&page=42>, dated Nov. 1, 2003, Tecumesh Group, Inc., 2 pages.
"Copy and Paste Multiple Fields," <http://fmforums.com/forum/topic/62943-copy-and-paste-multiple-fields/>, posted Oct. 20, 2008, Ocean West Consulting, Inc., 2 pages.
File Transit, "A to Z Clipboard 3.00.00 Screenshot," Community Forum Software by IP.Board 3.1.4, <http://www.filetransit.com/screenshot/php?id=52399>, printed Mar. 22, 2011, File Transit, 1 page.
"FileMaker Inc.: FileMaker Pro—Copy Multiple Fields to Clipboard Script," thread295-696177, <http://www.tek-tips.com/viewthread.cfm?qid=696177&page=42>, Tecumesh Group, Inc., dated Nov. 1, 2003, 2 pages.

* cited by examiner

Primary Examiner — Cao "Kevin" Nguyen
(74) Attorney, Agent, or Firm — Toler Law Group, PC (57) ABSTRACT A particular method includes detecting a context switch to a first interface. In response to the context switch, data values from a plurality of data fields of the first interface may automatically be copied to a shared storage location.

18 Claims, 7 Drawing Sheets

SYSTEMS AND METHODS OF COPYING DATA

BACKGROUND

Enterprise software systems are often divided into multiple applications, where each application maintains its own data and user interfaces. When entering similar data into different applications, a user may activate a source application, copy a desired data value from a first interface of the source application, activate a destination application, and paste the data value into an input field in a second interface of the destination application. When multiple data values are to be entered, this context switching process between applications may be performed once for each of the data values. However, iteratively switching between applications may be time-consuming.

SUMMARY

Systems and methods of copying and pasting data between interfaces (e.g., graphical user interfaces (GUIs)) are disclosed. In accordance with one technique, multiple data values may be copied from a first interface and pasted into a second interface without needing to context switch between the interfaces more than once. For example, multiple data values may automatically be copied from a first interface in response to a context switch to the first interface (i.e., without receiving a "copy" command). The multiple data values may then be used to populate the second interface in response to a paste command (e.g., a single mouse command or keyboard command). When the formats of the first interface and the second interface are different, the data values may automatically be reformatted before the data values are pasted into the second interface. The disclosed systems and methods may thus reduce time and an amount of user input to enter data into multiple GUIs.

DETAILED DESCRIPTION

In a particular embodiment, a computer-implemented method includes detecting a context switch to a first interface and, in response to the context switch, automatically copying data values from a plurality of first data fields of the first interface to a shared storage location.

In another particular embodiment, a computer system includes an input interface, an output interface, a processor, and a memory coupled to the processor. The memory stores instructions executable by the processor to receive first user input via the input interface, the first user input representing a first context switch to a first window that is displayed via the output interface. The instructions are also executable by the processor to, in response to the first context switch, automatically copy data values displayed within a plurality of first data fields of the first window to a shared storage location. The instructions are further executable by the processor to receive second user input via the input interface, the second user input representing a second context switch to a second window. The instructions are executable by the processor to receive third user input via the input interface. The third user input represents a paste command. The instructions are also executable by the processor to, upon receipt of the third user input, automatically populate a plurality of second data fields of the second window with the data values from the shared storage location based on a mapping between the first data fields and the second data fields.

In another particular embodiment, a computer-readable storage medium includes instructions that, when executed by a computer, cause the computer to detect a first context switch to a first interface and, in response to the first context switch, automatically copy first data values corresponding to a plurality of first data fields of the first interface to a shared storage location. The instructions are also executable by the computer to cause the computer to detect a second context switch to a second interface and, in response to the second context switch, automatically copy second data values corresponding to a plurality of second data fields of the second interface to the shared storage location. The instructions are further executable by the computer to cause the computer to detect a third context switch to a third interface and to receive user input at the third interface representing a paste command. The instructions are executable by the computer to cause the computer to, in response to the paste command, display a fourth interface that is operable to receive a user selection of the first data values or the second data values. The instructions are also executable by the computer to cause the computer to, when the first data values are selected at the fourth interface, automatically populate a plurality of third data fields of the third interface with the first data values based on a mapping between the first data fields and the third data fields. The instructions are further executable by the computer to cause the computer to, when the second data values are selected at the fourth interface, automatically populate the plurality of third data fields of the third interface with the second data values based on a mapping between the second data fields and the third data fields.

Figure 1:
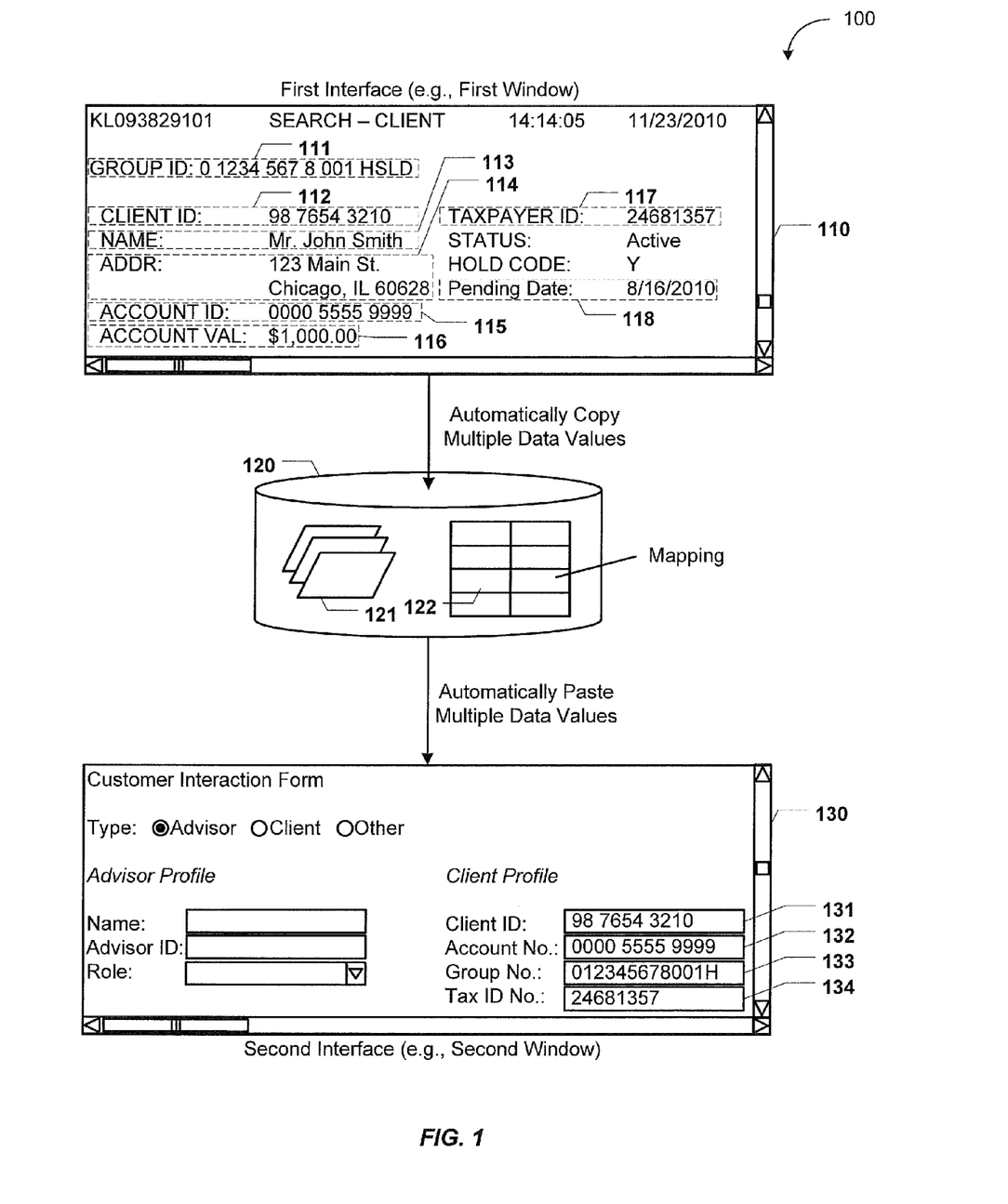
FIG. 1 is a diagram to illustrate a particular embodiment of a system operable to copy data from a first interface to a second interface.

FIG. 1 is a diagram to illustrate a particular embodiment of a system 100 that is operable to copy data from a first interface 110 to a second interface 130 by use of a shared storage location 120. In an illustrative embodiment, the system 100 is implemented using a computer system. For example, the first interface 110 and the second interface 130 may be displayed at an output device of the computer system and the shared storage location 120 may be implemented in a memory accessible to or within the computer system. In FIG. 1, the first interface 110 and the second interface 130 are interfaces of one or more financial planning applications. However, it should be noted that the use of financial planning applications and data is described for illustration purposes. The techniques disclosed herein may be used in conjunction with other types of applications or systems.

The first interface 110 may provide a window or other graphical user interface (GUI) object that includes a plurality of data fields. In accordance with the techniques described herein, the data values of multiple predetermined data fields may automatically be copied whenever a context switch to the first interface 110 (e.g., a focus switch that makes the first interface 110 an "active" interface) is detected. For example, data values from a GROUP ID field 111, a CLIENT ID field 112, a NAME field 113, an ADDR field 114, an ACCOUNT ID field 115, an ACCOUNT VAL field 116, a TAXPAYER ID field 117, and a Pending Date field 118 may automatically be copied to the shared storage location 120 (e.g., as data values 121) in response to detecting a context switch to the first interface 110. The context switch to the first interface 110 may be detected by a computer system in response to a user command, such as a single mouse command (e.g., a click at a location within the first interface 110) or a single keyboard command (e.g., an "Alt+Tab" input to switch to the first interface 110).

In a particular embodiment, the shared storage location 120 may be clipboard storage implemented or otherwise supported by an operating system. Alternately, the shared storage location 120 may be an output object that stores data serialized by an object corresponding to the first interface 110. For example, the object corresponding to the first interface 110 may inherit from and implement a serialization class that enables the object to output the values of the data fields 111-118 to a binary output file or to an in-memory data structure. A list of the data fields 111-118 from which the data values 121 are copied may be stored in the shared storage location, the output object, the object corresponding to the first interface 110, or any combination thereof. Alternately, coordinates (e.g., X-Y coordinates) of the data fields 111-118 at the first interface 110 may be stored. For example, X-Y coordinates of the GROUP ID field 111 may be (1, 3), indicating that the GROUP ID field 111 is located in the first column and third row of the first interface 110. Alternative implementation may include using pixel locations to define X-Y coordinates. Objects supported by an object-oriented programming language or system, such as C++ objects, Java objects, C# objects, Visual Basic objects, or other software objects, may be used to implement the first interface 110, the second interface 130, the shared storage location 120, or any combination thereof.

The data values 121 copied from the first interface 110 may be pasted into the second interface 130 in response to a paste command. When the data values 121 are serialized, the data values 121 may be unserialized in response to the paste command. For example, the paste command may be a single mouse command (e.g., a right-click that overrides default right click behavior of the mouse when the data values 121 are stored in the shared storage location 120) or a single keyboard command (e.g., a pre-defined hotkey). In a particular embodiment, a mapping 122 may associate one or more of the data fields 111-118 of the first interface 110 to one or more of data fields 131-134 of the second interface 130, so that data values from source fields (e.g., the data fields 111-118) are used to populate appropriate corresponding destination fields (e.g., the data fields 131-134). For example, the mapping 122 may be stored as a data structure that is a member of an object that implements the first interface 110, the second interface 130, the shared storage location 120, or any combination thereof. An illustrative embodiment of a mapping is further described with reference to FIG. 4.

In a particular embodiment, the mapping 122 may be defined in a configuration file. The configuration file may include a predefined list of source applications from which data is automatically captured in response to a context switch, a list of pages or screens within the source applications that include such data, a predefined list of destination applications into which data is pasted in response to a paste command, and a list of pages or screens within the destination applications that can be the target of such paste commands. It should be noted that applications, pages, and screens may be on more than one of the lists.

The configuration file may also assign expiration periods to data fields or data values. For example, a data value may be automatically deleted from the shared storage 120 when its expiration period elapses. Expiration of data values is further described with reference to FIG. 2. The configuration file may also indicate overwrite properties of the data values 121. For example, an additional copy of the data values 121 may be stored in the shared storage location 120 each time a context switch to the first interface 110 occurs. Alternatively, the data values 121 may be overwritten on each subsequent context switch to the first interface 110. Overwrite properties are further described with reference to FIG. 2. In another particular embodiment, data values within the shared storage location 120 may automatically expire or be removed from the shared storage location 120 upon use (e.g., upon being pasted into a destination window).

During operation, the data values 121 corresponding to the data fields 111-118 may automatically be copied to the shared storage location 120 in response to a context switch to the first interface 110. When a paste command is subsequently received at the second interface 130 (e.g., following a context switch to the second interface 130), one or more of the data values 121 may be used to populate the data fields 131-134 based on the mapping 122. To illustrate, the data value "98 7654 3210" from the CLIENT ID field 112 of the first interface 110 may be used to populate the Client ID field 131 of the second interface 130, the data value "0000 5555 9999" from the ACCOUNT ID field 115 may be used to populate the Account No. field 132, the data value "0 1234 567 8 001 HSLD" from the GROUP ID field 111 may be used to populate the Group No. field 133, and the data value "24681357" from the TAXPAYER ID field 117 may be used to populate the Tax ID No. field 134. It should be noted that not all of the data fields 111-118 of the first interface 110 may be mapped to corresponding data fields 131-134 of the second interface 130. For example, the mapping 122 may not include mappings for the data fields 113, 114, 116, and 118 (e.g., since no appropriate corresponding fields exist in the second interface 130). Thus, data values corresponding to the data fields 113, 114, 116, and 118 may not be pasted into the second interface 130 when the mapping 122 does not identify any corresponding fields in the second interface 130.

In a particular embodiment, one or more of the data fields 111-118 have a different data format than their mapped counterpart fields 131-134. For example, as illustrated in FIG. 1, the GROUP ID field 111 has a data format that permits spaces and includes a four-character suffix (e.g., "HSLD"), whereas the corresponding Group No. data field 133 does not permit spaces and includes a single-character suffix. In such situations, the data values 121 may be automatically converted to an appropriate destination format prior to being pasted into the second interface 130. For example, the value "0 1234 567 8 001 HSLD" from the GROUP ID field 111 may be converted to the value "012345678001H" prior to being input into the Group No. field 133, as illustrated in FIG. 1. Data type conversion (e.g., numerical to string), number format conversion (e.g., integer to floating point), date conversion (e.g., MM/DD/YY to DD/MM//YYYY), time format conversion (e.g., 12-hour to 24-hour), and other conversions may also be performed.

In another particular embodiment, the automatic copying and pasting functionality provided by the system 100 of FIG. 1 may be selectively controlled by a user (e.g., turned on and turned off via one or more commands or hotkeys). For example, a first hotkey may be used to toggle the multi-field copy/paste functionality and a second hotkey may be used to delete all of the data values 121 from the shared storage location 120. In another particular embodiment, the system 100 may generate one or more logs to indicate a frequency of activation/deactivation of the multi-field copy/paste functionality, a number of unique data captures per source and destination entity, and a number of repeated data captures. The logs may also store the data values 121 until the data values 121 expire or are deleted.

It will be appreciated that the system 100 of FIG. 1 may thus enable the efficient and convenient copying and pasting of data values from multiple fields without iteratively context switching between interfaces. It will also be appreciated that the system 100 of FIG. 1 may convert data values into appropriate destination formats. The system 100 of FIG. 1 may thus provide time savings to users that execute workflows that include entry of similar data or the same data into multiple interfaces. For example, a financial planner or call center employee may receive a phone call from a customer. Part of a financial planning or call center workflow may including populating a first screen with data values that are associated with the customer and that are available at a second screen. Without the system 100 of FIG. 1, the financial planner or call center employee may manually copy and paste the data values one-at-a-time while the customer waits for a response. In contrast, the system 100 of FIG. 1 may enable automatic and fast entry of data values, resulting in a more pleasant customer experience in systems where the customer may expect or prefer a prompt response.

Figure 2:
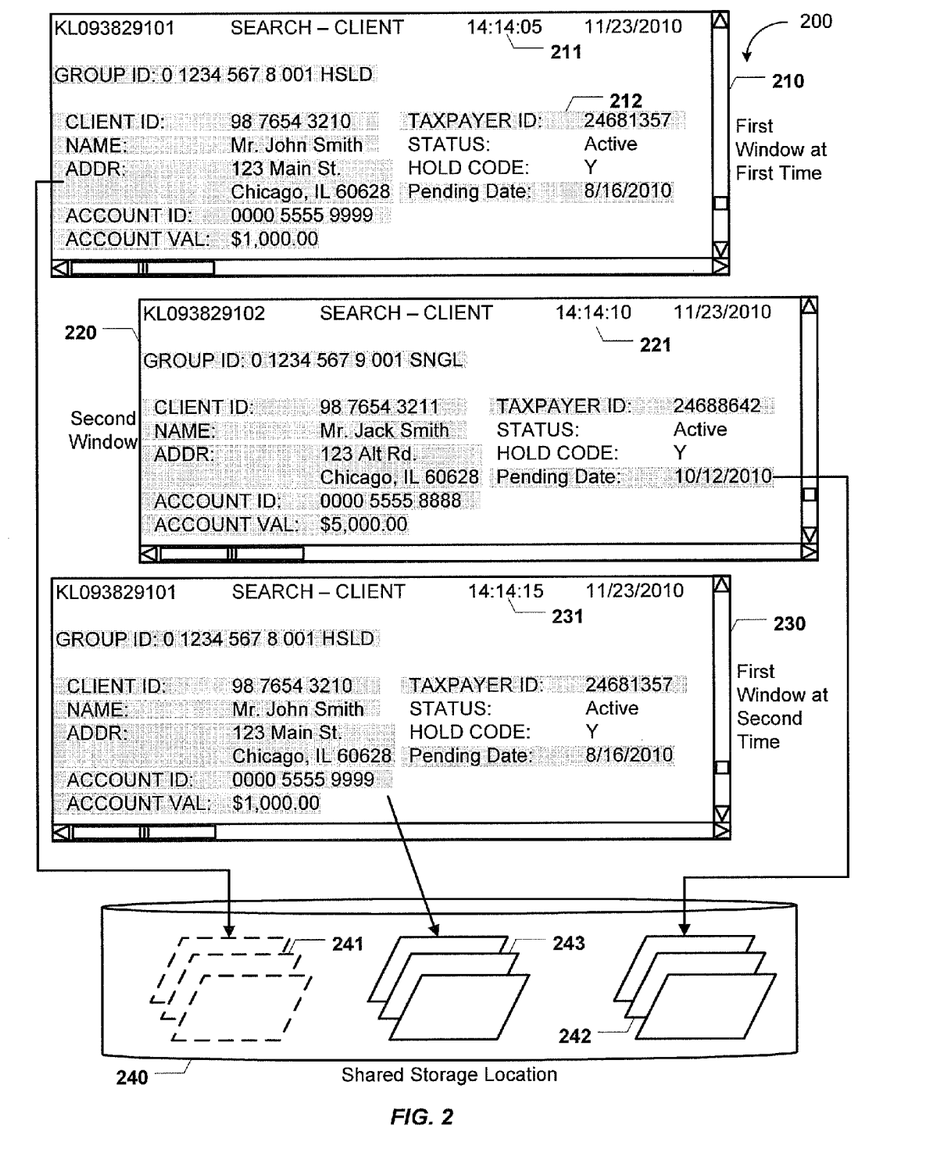
FIG. 2 is a diagram to illustrate a particular embodiment of a system operable to copy data from multiple source interfaces.
Figure 3:
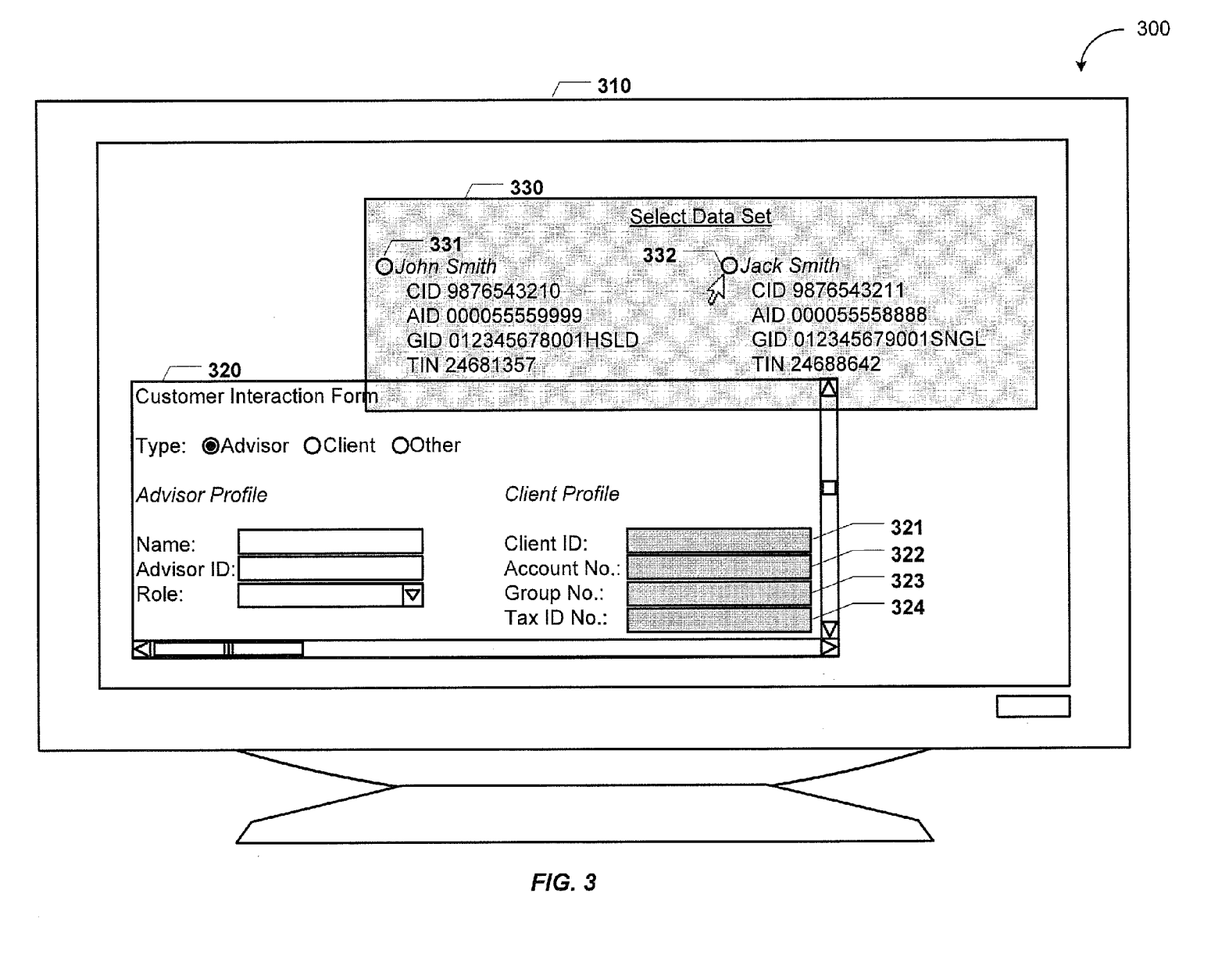
FIG. 3 is a diagram to illustrate a particular embodiment of a method of populating a destination interface, including presentation of a selection interface operable to select between data from the multiple source interfaces of FIG. 2.

FIGS. 2-3 are diagrams to illustrate a particular embodiment of a system 200 that is operable to copy data from multiple source interfaces (e.g., illustrative windows 210, 220, and 230).

The first window 210 may include information associated with a first client named John Smith. In response to a context switch to the first window 210 (e.g., at a first time 211 of 2:14:05 pm), data values from a plurality of data fields of the first window 210 may be copied to a shared storage location 240 (e.g., as illustrative first data values 241). The first window 210 may include visual indicators identifying data fields from which data values are automatically copied (e.g., via an illustrative highlight indicator 212). The second window 220 and the third window 230 may also include such visual indicators. Other visual indicators may also be used, such as font variation, font size variation, color variation, and border variation.

The second window 220 may include information associated with a second client named Jack Smith. In response to a context switch to the second window 220 (e.g., at a second time 221 of 2:14:10 pm), data values from a plurality of data fields of the second window 220 may be copied to the shared storage location 240 (e.g., as illustrative second data values 242).

The third window 230 may represent information associated with the first client named John Smith at a later time than the first window 210. In response to a context switch to the third window 230 (e.g., at a third time 231 of 2:14:15 pm), data values from a plurality of data fields of the third window 230 may be copied to the shared storage location 240 (e.g., as illustrative third data values 242). Depending on the configuration of the system 200, the third data values 243 may overwrite the first data values 241 at the shared storage location 240 or may coexist with the first data values 241 at the shared storage location 240.

When data values from multiple source windows are stored in the shared storage location 240, a selection interface may be presented to a user. For example, FIG. 3 is a diagram to illustrate a particular embodiment of presenting such a selection interface 330 at a display device 310 in response to receiving a paste command at a destination window 320, and is generally designated 300.

As described with reference to the source windows 210, 220, and 230 of FIG. 2, the destination window 320 may also include visual indicators. The visual indicators may identify data fields for which mappings exist and that can be automatically populated with data values from other windows. For example, as illustrated in FIG. 3, text boxes corresponding to data fields 321-324 may be highlighted.

When a paste command is received at the destination window 320 (or while the destination window 320 is displayed or selected), the selection interface 330 may be displayed. In a particular embodiment, the selection interface 330 may be at least partially transparent and may at least partially overlay the destination window 320. Alternatively, the selection interface 330 may be opaque, displayed in a separate region of the display device 310 than the destination window 320, or any combination thereof. The selection window 330 may be operable to receive a user selection of one of the sets of data values stored at the shared storage location 240 of FIG. 2. For example, the selection window 330 may include a first control 331 operable to select the third data values 243 for John Smith and a second control 332 operable to select the second data values 242 for Jack Smith. In response to a user selection of the first control 331 or the second control 332, all of the corresponding data values may be automatically and concurrently pasted into the data fields 321-324 of the destination window 320.

It will be appreciated that the system illustrated in FIGS. 2-3 may thus enable copying, reformatting, and pasting of data values from multiple fields of one or more interfaces to a destination interface without iterative context switching. It will also be appreciated that the system illustrated in FIGS. 2-3 may enable selecting between multiple sets of available data values from multiple source windows.

Figure 4:
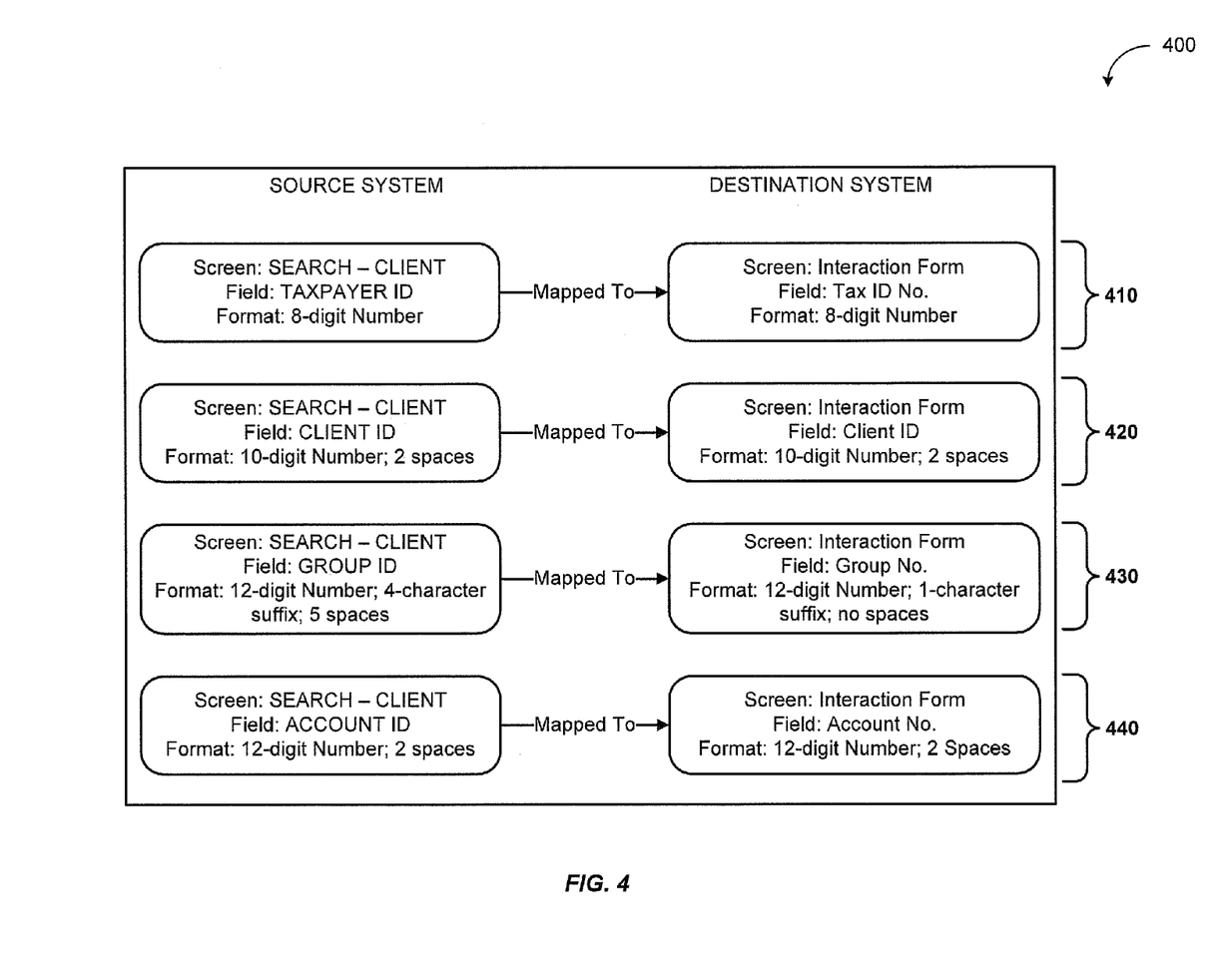
FIG. 4 is a diagram to illustrate a particular embodiment of a mapping between data fields of a source interface and a destination interface.

FIG. 4 is a diagram to illustrate a particular embodiment of a mapping 400 between data fields of a source system and a destination system. In an illustrative embodiment, the mapping 400 may be the mapping 122 of FIG. 1.

In a particular embodiment, the mapping 400 is a screen-level mapping between data fields. For example, a TAXPAYER ID field of a SEARCH-CLIENT screen (e.g., the TAXPAYER ID field 117 of FIG. 1) may be mapped to a Tax ID No. field of an Interaction Form screen (e.g., the Tax ID No. field 134 of FIG. 1), as indicated at 410. A CLIENT ID field of the SEARCH-CLIENT screen (e.g., the CLIENT ID field 112 of FIG. 1) may be mapped to a Client ID field of the Interaction Form screen (e.g., the Client ID field 131 of FIG. 1), as indicated at 420. A GROUP ID field of the SEARCH-CLIENT screen (e.g., the GROUP ID field 111 of FIG. 1) may be mapped to a Group No. field of the Interaction Form screen (e.g., the Group No. field 133 of FIG. 1), as indicated at 430. An ACCOUNT ID field of the SEARCH-CLIENT screen (e.g., the ACCOUNT ID field 115 of FIG. 1) may be mapped to an Account No. field of the Interaction Form screen (e.g., the Account No. field 132 of FIG. 1), as indicated at 440.

When the mapping 400 indicates that a first data field having a first data format is mapped to a second data field having a second data format that is different than the first data format, the data value from the first data field may be converted to the second data format before being pasted into the second data field. For example, as indicated at 430, the GROUP ID field of the SEARCH-CLIENT screen has a four-character suffix and five spaces, whereas the corresponding Group. No. field of the Interaction Form screen has a one-character suffix and zero spaces. Thus, the suffix of the data value may be shortened to one character and the spaces of the data value may be removed, as illustrated in FIG. 1 by the conversion of "0 1234 5678 001 HSLD" to "012345678001H."

It should be noted that the one-to-one relations depicted in FIG. 4 are for illustration only. The mapping 400 may also define one-to-many relations (e.g., mapping a single source field to multiple destination fields of the same destination application or of multiple destination applications), many-to-one relations (e.g., mapping multiple source fields of one or more source applications to a single destination field in a destination application), and many-to-many relations (e.g., mapping multiple source fields of one or more source applications to multiple destination fields of one or more destination applications).

Figure 5:
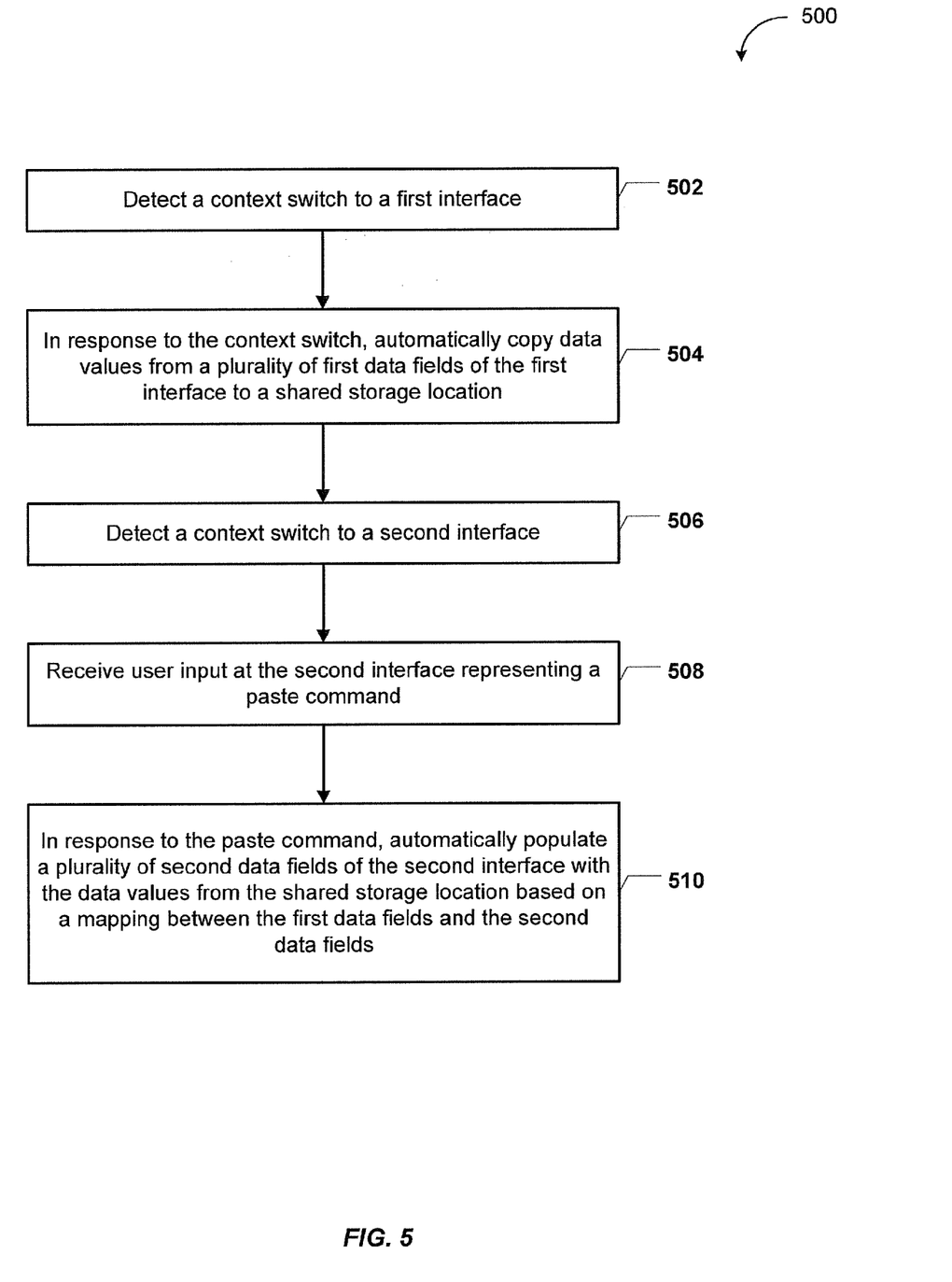
FIG. 5 is a flow diagram to illustrate a particular embodiment of a method of copying data from a first interface to a second interface.

FIG. 5 is a flow diagram to illustrate a particular embodiment of a method 500 of copying data from a first interface to a second interface. In an illustrative embodiment, the method 500 may be performed at the system 100 of FIG. 1 or the system 200 of FIG. 2.

The method 500 may include detecting a context switch to a first interface, at 502. For example, in FIG. 1, a context switch to the first interface 110 may be detected (e.g., a user may click a mouse while a cursor corresponding to the mouse is located within the first interface 110). The method 500 may also include automatically copying data values from a plurality of first data fields of the first interface to a shared storage location in response to the context switch, at 504. For example, in FIG. 1, the data values 121 from the data fields 111-118 may automatically be copied to the shared storage location 120 upon detecting the context switch to the first interface 110.

The method 500 may further include detecting a context switch to a second interface, at 506, and receiving user input at the second interface representing a paste command, at 508. For example, in FIG. 1, a context switch to the second interface 130 may be detected and user input representing a paste command (e.g., a keyboard hotkey corresponding to a "populate all appropriate data fields" command) may be received at the second interface 130.

The method 500 may include, in response to the paste command, automatically populating a plurality of second data fields of the second interface with the data values from the shared storage location based on a mapping between the first data fields and the second data fields, at 510. For example, in FIG. 1, the data fields 131-134 of the second interface 130 may be populated based on the mapping 122, where all of the data fields 131-134 are populated substantially concurrently without additional user input.

It will be appreciated that the method 500 of FIG. 1 may enable the efficient and convenient copying and pasting of data values from multiple fields without iteratively context switching between interfaces. The method 500 of FIG. 5 may thus provide time savings to users that execute workflows that include entry of similar data or the same data into multiple interfaces.

Figure 6:
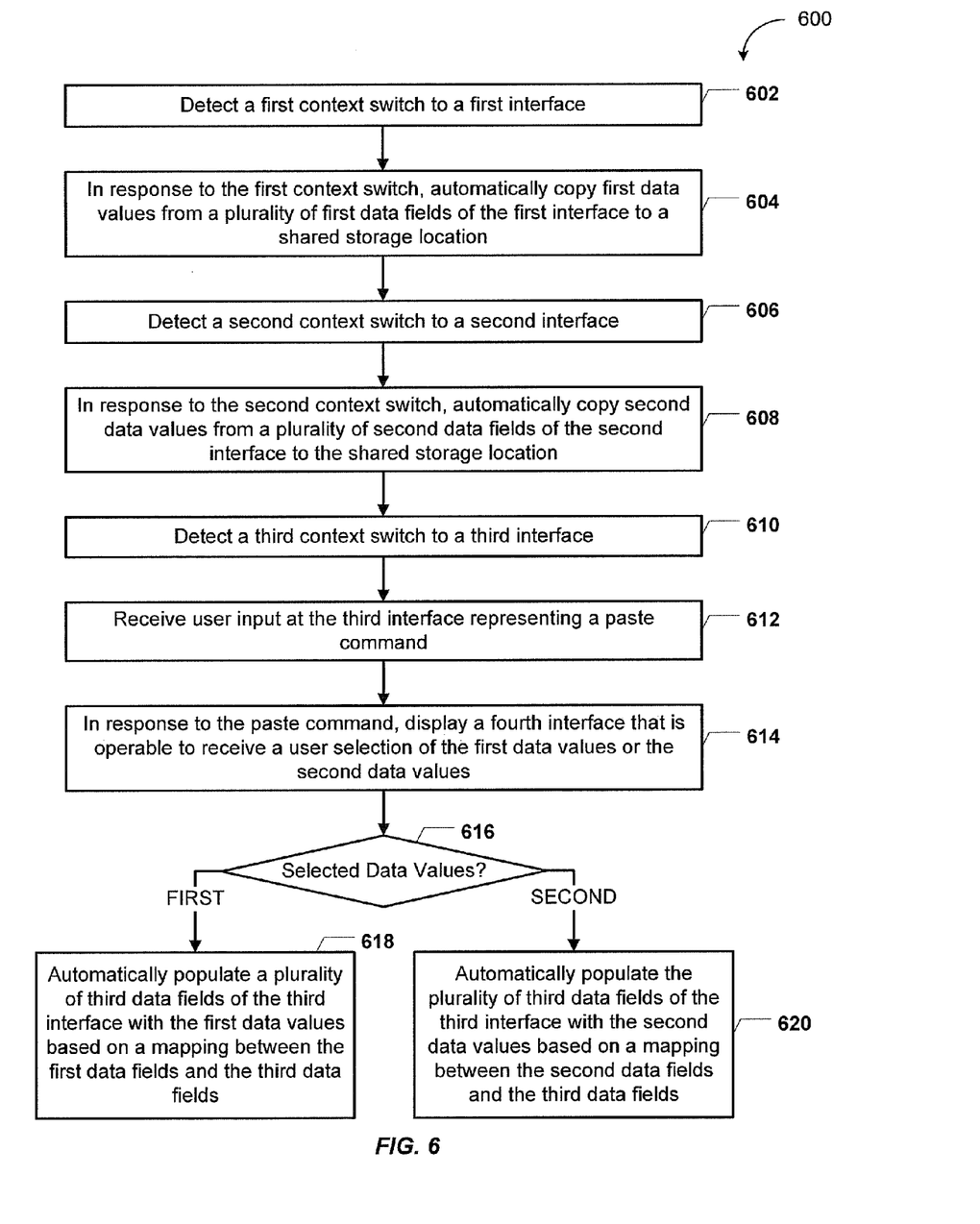
FIG. 6 is a flow diagram to illustrate another particular embodiment of a method of copying data from a first interface to a second interface.

FIG. 6 is a flow diagram to illustrate another particular embodiment of a method 600 of copying data from a first interface to a second interface. In an illustrative embodiment, the method 600 may be performed at the system 100 of FIG. 1 or the system 200 of FIG. 2.

The method 600 may include detecting a first context switch to a first interface, at 602. For example, in FIG. 2, a context switch to the first window 210 may be detected. The method 600 may also include, in response to the first context switch, automatically copying first data values from a plurality of first data fields of the first interface to a shared storage location, at 604. For example, in FIG. 2, the data values 241 corresponding to multiple fields of the first interface 210 may be automatically copied to the shared storage location 240 in response to detecting the context switch to the first interface 210.

The method 600 may further include detecting a second context switch to a second interface, at 606. For example, in FIG. 2, a context switch to the second window 220 may be detected. The method 600 may include, in response to detecting the second context switch, automatically copying second data values from a plurality of second data fields of the second interface to the shared storage location, at 608. For example, in FIG. 2, the data values 242 corresponding to multiple fields of the second interface 220 may automatically be copied to the shared storage location 240 in response to detecting the context switch to the second interface 220.

The method 600 may also include detecting a third context switch to a third interface, at 610, and receiving user input at the third interface representing a paste command, at 612. For example, in FIG. 3, a context switch to the destination window 320 may be detected and user input representing a paste command may be received at the destination window 320. The method 600 may further include, in response to the paste command, displaying a fourth interface that is operable to receive a user selection of either the first data values or the second data values, at 614. For example, in FIG. 3, the selection interface 330 may be displayed.

The method 600 may include determining whether the first data values or the second values are selected, at 616. The method 600 may also include, when the first data values are selected, automatically populating a plurality of third data fields of the third interface with the first data values based on a mapping between the first data fields and the third data fields, at 618. For example, in FIG. 3, when the first control 331 is selected, the data fields 321-324 may be populated with the data values for John Smith corresponding to the third interface 230 of FIG. 2.

The method 600 may further include, when the second data values are selected, automatically populating the plurality of third data fields of the third interface with the second data values based on a mapping between the second data fields and the third data fields, at 620. For example, in FIG. 3, when the second control 332 is selected, the data fields 321-324 may be populated with the data values for Jack Smith corresponding to the second interface 220 of FIG. 2.

It will be appreciated that the method 600 of FIG. 6 may enable efficient and convenient copying and pasting of data from multiple source interfaces into a destination interface. For example, users that work with multi-screen, multi-application, or multi-system workflows may select between different copied data sets and paste the selected data set into a destination interface without iterative context switching. Such workflows may be present in financial services tools, call center applications, and other systems or applications.

Figure 7:
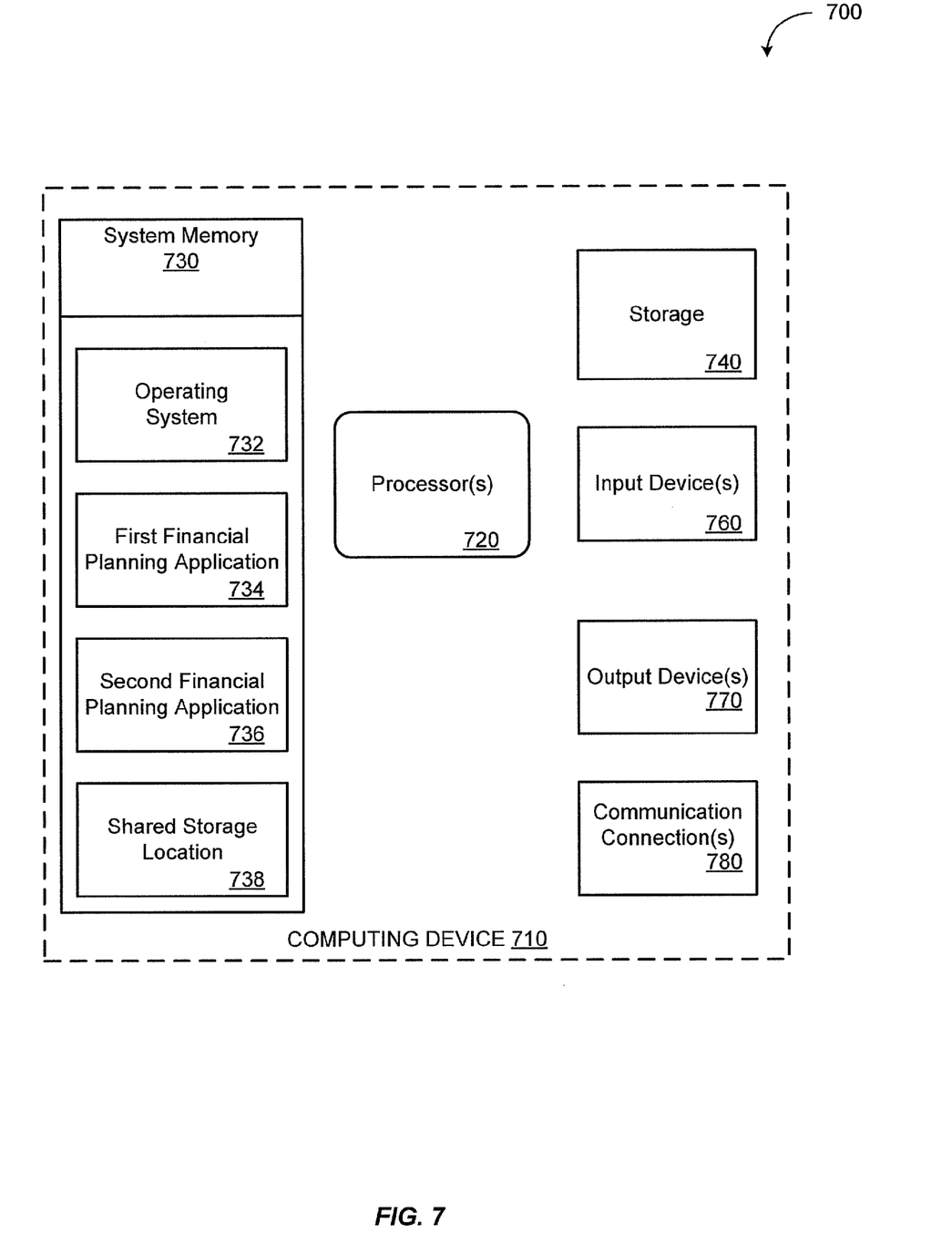
FIG. 7 is a diagram to illustrate a particular embodiment of a computing environment including a computing device operable to support embodiments of computer-implemented methods, computer program products, and system components as illustrated in FIGS. 1-6.

FIG. 7 shows a block diagram of a computing environment 700 including a computing device 710 operable to support embodiments of computer-implemented methods, computer program products, and system components according to the present disclosure.

The computing device 710 includes at least one processor 720 and a system memory 730. For example, the computing device 710 may be a desktop computer, a laptop computer, a tablet computer, a mobile phone, a server, or any other fixed or mobile computing device. Depending on the configuration and type of computing device, the system memory 730 may be volatile (such as random access memory or "RAM"), non-volatile (such as read-only memory or "ROM," flash memory, and similar memory devices that maintain stored data even when power is not provided), some combination thereof, or some other memory. The system memory 730 may include an operating system 732, one or more application platforms, one or more applications, and program data. In the embodiment illustrated, the system memory 730 includes a first financial planning application 734 and a second financial planning application 736. The system memory 730 also includes a shared storage location 738 that may be used in entering similar data or the same data into the first financial planning application 734 and the second financial planning application 736 in accordance with the techniques disclosed herein. In an illustrative embodiment, the shared storage location 738 is the shared storage location 120 of FIG. 1 or the shared storage location 240 of FIG. 2.

The computing device 710 may also have additional features or functionality. For example, the computing device 710 may also include removable and/or non-removable additional data storage devices such as magnetic disks, optical disks, tape, and memory cards. Such additional storage is illustrated in FIG. 7 by storage 740. Computer-readable or processor-readable storage media may include volatile and/or non-volatile storage and removable and/or non-removable media implemented in any technology for storage of information such as computer-readable instructions, data structures, program components or other data. The system memory 730, removable storage, and non-removable storage are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 710. Any such computer storage media may be part of the computing device 710.

The computing device 710 may also have input device(s) 760, such as a keyboard, mouse, pen, voice input device, touch input device, etc. connected via one or more input interfaces. For example, the input device(s) 760 may be connected via one or more wired or wireless input interfaces, such as a universal serial bus (USB) interface, a PS/2 interface, or some other input interface. Output device(s) 770, such as a display (e.g., the display device 310 of FIG. 3), speakers, printer, etc. may also be included and connected via one or more output interfaces. For example, the output device(s) 770 may be connected via one or more wired or wireless output interfaces, such as a USB interface, a video graphics array (VGA) interface, a serial interface, a digital visual interface (DVI), a high-definition multimedia interface (HDMI), or some other output interface. In an illustrative embodiment, the input device(s) 760 are operable to receive user input representing context switches and paste commands, and the output device(s) 770 are operable to display source interfaces, destination interfaces, and selection interfaces as described herein.

The computing device 710 also contains one or more communication connections 780 that allow the computing device 710 to communicate with other computing devices over a wired or a wireless network. For example, particular embodiments of disclosed techniques may be implemented in conjunction with a client-server architecture. To illustrate, the computing device 710 may be an application server or other server that hosts the first financial planning application 734 and the second financial planning application 736. A user may operate a client computing device that accesses the application server via the one or more communication connections 780 (e.g., via an Internet browser executing on the client computing device). In such an implementation, the shared storage location 738 may alternatively be located at the client computing device instead of at the application server, and data values stored in the shared storage location 738 may be scraped from the Internet browser or may be provided by the application server.

It will be appreciated that not all of the components or devices illustrated in FIG. 7 or otherwise described in the previous paragraphs are necessary to support embodiments as herein described. For example, the storage 740 may be optional.

Although the exemplary embodiments described herein are intended to enable a person skilled in the art to practice such embodiments, it should be understood that other embodiments may be realized and that logical and mechanical changes may be made without departing from the scope of the present disclosure. Thus, the detailed description herein is presented for purposes of illustration only and not for limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods may be implemented without departing from the scope of the disclosure. Similarly, while the description may make reference to web clients, personal computers, and servers, it will be appreciated that other embodiments may include implementations using point of service (POS) devices, kiosks, handheld devices such as personal digital assistants and cellular telephones, or other devices. This disclosure is intended to cover any and all subsequent adaptations or variations of various embodiments.

The provided Abstract is not intended to be used in interpreting or limiting the scope or meaning of the claims. In addition, the disclosure is not to be interpreted as indicating that the claimed embodiments require more features than are expressly recited in each claim. Thus, the present disclosure is not intended to be limited to the embodiments shown herein but is to be accorded the widest scope possible consistent with the principles and novel features as defined by the following claims.

What is claimed is:

1. A computer-implemented method comprising:
receiving, via an input interface, first user input representing a context switch to a first interface;
detecting the context switch to the first interface based on the first user input;
in response to the context switch, automatically copying data values from a plurality of first data fields of the first interface to a shared storage location;
receiving second user input representing a second context switch to a second interface;
receiving third user input via the input interface, the third user input representing a paste command; and
upon receipt of the third user input, automatically populating a plurality of second data fields of the second interface with the data values from the shared storage location based on a mapping between the first data fields and the second data fields.

2. The method of claim 1, wherein the first interface corresponds to a first window and wherein detecting the context switch to the first interface comprises detecting that the first window is in focus at a multi-window graphical user interface (GUI), wherein detecting that the first window is in focus comprises detecting a single mouse command or a single keyboard command.

3. The method of claim 1, wherein a first data field of the first interface has a first data format, wherein a second data field of the second interface is mapped to the first data field and has a second data format that is different than the first data format, and further comprising automatically converting a data value from the first data format to the second data format before populating the second data field with the data value.

4. The method of claim 1, wherein the third user input representing the paste command comprises a single mouse command or a single keyboard command.

5. The method of claim 1, wherein the shared storage location comprises a clipboard storage location.

6. The method of claim 1, wherein the shared storage location comprises a storage object.

7. The method of claim 6, wherein automatically copying the data values includes serializing the data values to the storage object, and wherein automatically populating the plurality of second data fields includes unserializing the data values from the storage object.

8. The method of claim 6, wherein the mapping between the first data fields and the second data fields is defined in the storage object.

9. The method of claim 1, wherein the mapping between the first data fields and the second data fields is stored in a configuration file at the shared storage location.

10. The method of claim 9, wherein the configuration file stores mappings between data fields of a plurality of interfaces.

11. The method of claim 1, wherein the data values have an associated expiration duration, and further comprising deleting the data values from the shared storage location when the expiration duration has elapsed.

12. The method of claim 1, further comprising detecting another context switch to the first interface and, in response, automatically overwriting the data values at the shared storage location with second data values from the plurality of first data fields.

13. The method of claim 1, further comprising detecting another context switch to the first interface and, in response, automatically copying second data values from the plurality of first data fields to the shared storage location without overwriting the data values at the shared storage location.

14. The method of claim 1, wherein the first interface includes visual indicators identifying the plurality of first data fields and wherein the second interface includes visual indicators identifying the plurality of second data fields.

15. A system, comprising:
an input interface;
an output interface;
a processor; and
a memory coupled to the processor, the memory storing instructions executable by the processor to:
receive first user input via the input interface, the first user input representing a first context switch to a first window that is displayed via the output interface;
in response to the first user input representing the first context switch, automatically copy data values from a plurality of first data fields of the first window to a shared storage location;
receive second user input via the input interface, the second user input representing a second context switch to a second window;
receive third user input via the input interface, the third user input representing a paste command; and
upon receipt of the third user input, automatically populate a plurality of second data fields of the second window with the data values from the shared storage location based on a mapping between the first data fields and the second data fields.

16. The system of claim 15, wherein the first window and the second window are part of one or more financial planning applications and wherein the plurality of first data fields includes a taxpayer identifier, a client identifier, an account identifier, a group identifier, a name, an address, a monetary amount, or any combination thereof.

17. A non-transitory computer-readable storage medium comprising instructions that, when executed by a computer, cause the computer to:
detect a first context switch to a first interface;
in response to the first context switch, automatically copy first data values corresponding to a plurality of first data fields of the first interface to a shared storage location;
detect a second context switch to a second interface;
in response to the second context switch, automatically copy second data values corresponding to a plurality of second data fields of the second interface to the shared storage location;
detect a third context switch to a third interface;
receive user input at the third interface representing a paste command; and
in response to the user input representing the paste command, display a fourth interface that is operable to receive a user selection of the first data values or the second data values;
when the first data values are selected at the fourth interface, automatically populate a plurality of third data fields of the third interface with the first data values based on a mapping between the first data fields and the third data fields; and
when the second data values are selected at the fourth interface, automatically populate the plurality of third data fields of the third interface with the second data values based on a mapping between the second data fields and the third data fields.

18. The non-transitory computer-readable storage medium of claim 17, wherein the fourth interface is at least partially transparent and wherein the fourth interface at least partially overlays the third interface.

* * * * *